(No Model.) 2 Sheets—Sheet 1.

W. J. BREWER.
ROLLER BEARING FOR CAR AXLES.

No. 396,324. Patented Jan. 15, 1889.

Attest:
Jno. G. Hinkel Jr.
Sidney L. Johnson

Inventor:
Wm. Jno. Brewer
by Foster & Freeman
Attys.

(No Model.) 2 Sheets—Sheet 2.
W. J. BREWER.
ROLLER BEARING FOR CAR AXLES.
No. 396,324. Patented Jan. 15, 1889.
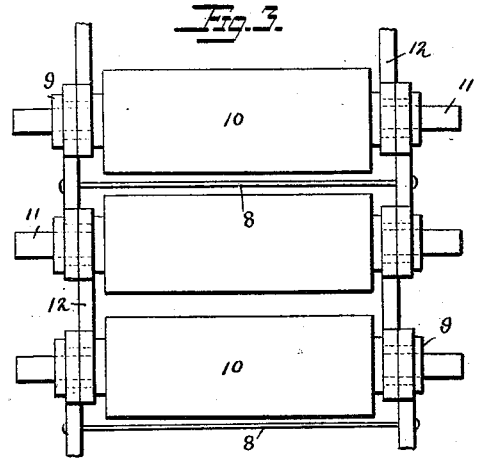
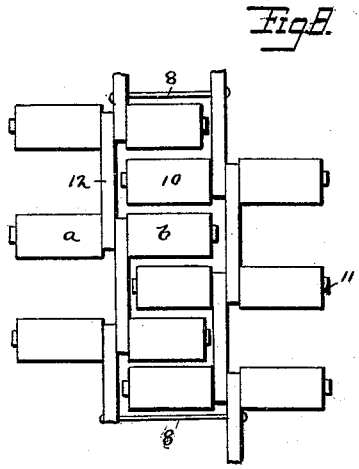
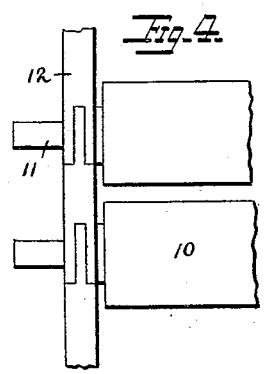
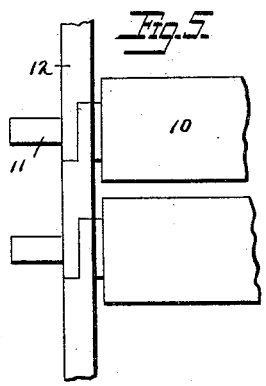
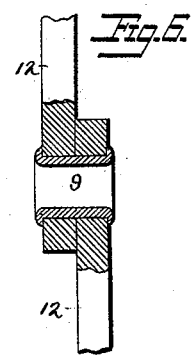
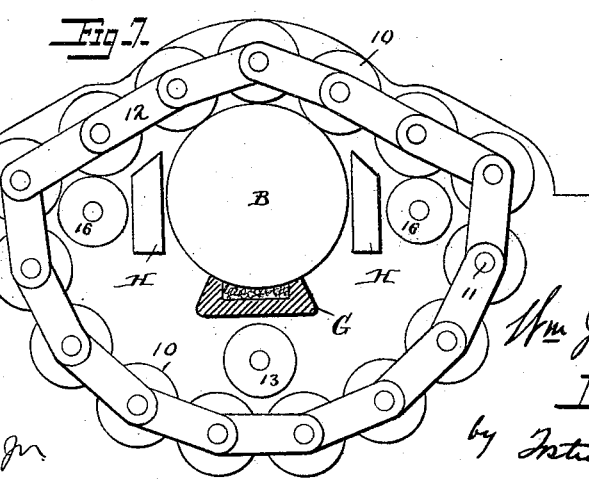

UNITED STATES PATENT OFFICE.

WILLIAM JOHN BREWER, OF LONDON, ENGLAND.

ROLLER-BEARING FOR CAR-AXLES.

SPECIFICATION forming part of Letters Patent No. 396,324, dated January 15, 1889.

Application filed March 13, 1888. Serial No. 267,085. (No model.)

*To all whom it may concern:*

Be it known that I, WILLIAM JOHN BREWER, a subject of the Queen of Great Britain, residing at London, England, have invented certain new and useful Improvements in Roller-Bearings for Car-Axles, of which the following is a specification.

My invention relates to an improved construction for the bearings of shafts and other journals where it is desirable to reduce the friction between the fixed and moving surfaces. The invention is particularly applicable to the bearings of car-axles, and in the accompanying drawings is illustrated in connection therewith.

Figure 1:
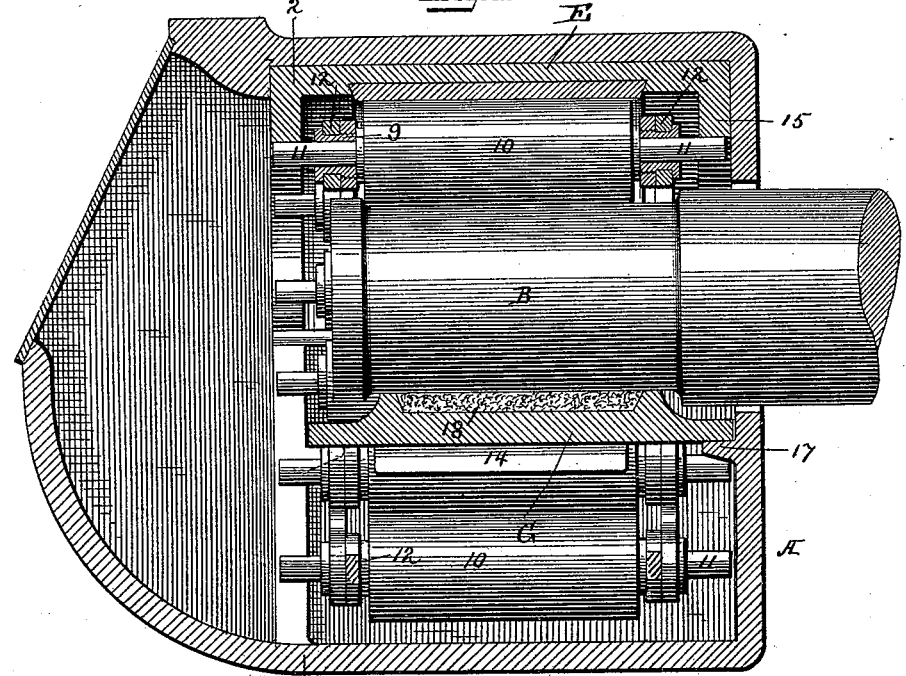
Figure 2:
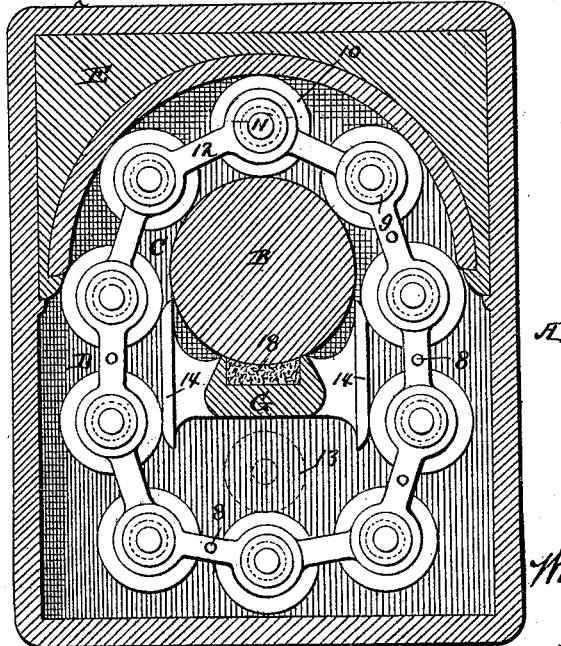

In said drawings, Figure 1 is a vertical transverse section of a car-axle box embodying the improvements, the axle being in place therein. Fig. 2 is a vertical sectional elevation of the same, taken on the line 2 2 of Fig. 1. Fig. 3 is an elevation of a portion of the connected series of roller-bearings. Figs. 4 and 5 are modified forms of the links hereinafter described, and Fig. 6 shows one form of bushing. Fig. 7 is a vertical sectional elevation of a modified form of the manner of guiding the connected series of roller-bearings away from the axle-journal, and Fig. 8 is a modified form of the connected series of roller-bearings.
In the drawings, the axle-box A is of the usual rectangular shape, adapted to contain and seat the journal of an axle, B. It has heretofore been proposed to employ in such boxes a series of anti-friction rollers interposed between the journal and a bearing-block that is held against the ceiling of the box. The present invention is designed as an improvement over such structure; and it consists in a series of roller-bearings, 10, linked together to form an endless chain of rolls, C, that are interposed between the walls of the axle-box and the journal, and adapted to bear and move against said journal and walls to an extent equal to the bearing required to properly support the weight the axle and wheel sustain, the said box being provided with means for directing the roller-bearings away from the journal as soon as they pass their effective or working bearing-points, so that all unnecessary contact and friction is removed from said journals.

The endless chain flexibly connecting the roller-bearings 10 together is formed by two series of links, 12, located upon the opposite ends of the rollers, that find their pivotal points or hinges on the journals 11 of said rollers, and which are prevented from becoming disconnected by bolts 8, which tie the opposite links together. These links may simply occupy alternate positions, as seen in Fig. 3, or have their ends tongue-and-grooved, as in Figs. 4 and 5, as may be found desirable in practice. In either case the openings in the links will be preferably provided with a bushing, 9, that may be headed at one end and screw-threaded at the other, as in Fig. 1, or simply headed down onto the opposite sides of the links, as in Fig. 6, whereby the openings in the ends of the links are prevented from becoming elongated by wear, and thus disturb the relation of the rollers with each other or permit them to contact with one another, a result that has been found undesirable in practice. When the bushings have become worn, of course they may be replaced by new ones, and hence the necessity of renewing the chain on account of the wear of its links is obviated.

The endless chain is made of sufficient length, so that the rollers may drop or be directed away from the journal after passing their effective bearing-points on the journal, and so as to pass through a quantity of oil contained in the axle-box, as seen in Fig. 2, where the series of rollers may pass around an idle-roll, 13, (indicated by dotted lines,) and thus prevent the oppositely-moving portions of the series from battering each other, as they would be likely to do in practice without such a device. While this idle-roll 13 will prevent this defective operation, I prefer to employ a stripping guide or guides, 14, formed in the box, adapted to contact either with the rollers 10, the chain, or with the ends of their journals 11, which project beyond the links of the chain, and adapted to strip or guide the rollers away from the journal and thus keep them not only from unnecessary contact therewith, but form, in connection with the walls of the box, a channel or guideway, so that the connected series of rollers will be constantly kept moving in the same path.

Instead of having the walls of the box bear directly upon the series of rollers 10, I prefer to provide the box with a shell, E, either formed in whole or in part of composition metal, which shell may be removed when worn and replaced by another. As an additional bearing, the journals 11 of the rollers 10 may be extended, as in Fig. 1, so as to be borne against by bearing-flanges 15 of the shell E. These journals 11 may be formed integral with the rollers, or they may consist of independent rods passing loosely through the rollers, so that the two may rotate independently, suitable means being provided to prevent the shafts from becoming displaced, or said shafts and the rollers may be secured tightly together.

In the modified form shown in Fig. 7 the connected series of rollers 10, after passing their effective bearing-point on the journal of the axle B, are guided away therefrom by a roller-guide, 16, in lieu of the guide 14, and thence under a roll, 13, through the body of oil contained by the axle-box. In this instance, as also in Figs. 1 and 2, the journal is provided with a fixed bottom rest, G, to prevent any vertical thrust of the axle-box thereon, and of course it may also be provided with fixed side rests, H, to take the side-thrusts. These fixed rests, or either of them, may be removable, as shown in Figs. 1 and 2, wherein the rest G is seated in flanges 17, projecting from the walls of the box, and may be recessed to hold a piece of felt or waste, 18, that will hold considerable of the lubricant and constantly apply it to the journal.

In long journals the roller-bearings may be formed of two series of connected rollers arranged alternately or to partially lap each other, as shown in Fig. 8, wherein the two series of links 12 support both series of rollers, being connected by a cross bolt or bar, 8, as before.

Of course instead of the two parts $a$ $b$ of each roller being made integral, they may each consist of independent rollers supported upon a common spindle, and this will be the preferred form.

What I claim is—

1. In roller-bearings for journals, the combination, with a connected series of rollers adapted to contact with only a portion of the journal at one time, of a stripping guide or guides for directing the series of rollers away from the journal after they have passed their effective bearing-point, substantially as described.

2. In roller-bearings for journals, the combination, with a connected series of rollers adapted to contact with only a portion of the journal at one time, of a stripping guide or guides for directing the series of rollers away from the journal after they have passed their effective bearing-point, and an idle-roll, 13, substantially as described.

3. The combination, with a journal, a series of rollers, 10, and links 12, connecting said rollers in an endless series and affording a bearing for said journal, of a bushing, 9, connecting the ends of two adjacent links together, substantially as described.

4. In roller-bearings for journals, the combination, with a connected series of rollers adapted to contact with only a portion of the journal at one time, of a fixed rest, G, to take the vertical thrust of the axle-box and provided with a recess for an absorbent of the lubricant, substantially as described.

5. In roller-bearings for journals, the combination, with a connected series of rollers adapted to contact with only a portion of the journal at one time, of a bearing-shell, E, interposed between the rollers and the wall of the box, and a stripping guide or guides for directing the series of rollers away from the journal after they have passed the effective bearing-points between said journal and the shell, substantially as described.

6. In roller-bearings for journals, the combination, with a connected series of rollers adapted to contact with the journal and having projecting journals 11, of a bearing-shell, E, provided with flanges 15 for contact with the journals of the rollers, substantially as described.

In testimony whereof I have signed my name to this specification in the presence of two subscribing witnesses.

WILLIAM JOHN BREWER.

Witnesses:
   J. L. WALSH,
   ERNEST F. AYRAULT.